Dec. 12, 1933.  G. T. BUDDLE  1,939,291
FISHHOOK
Filed March 25, 1931
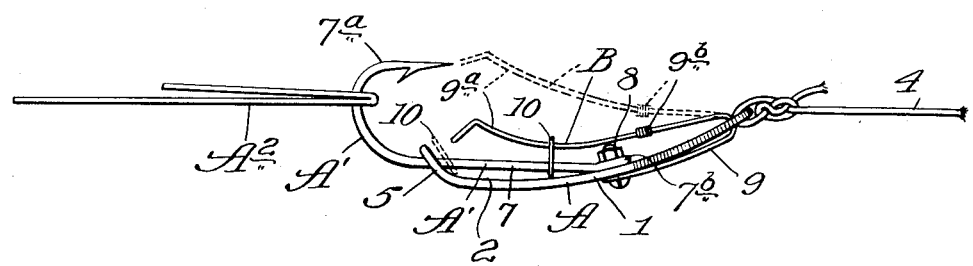
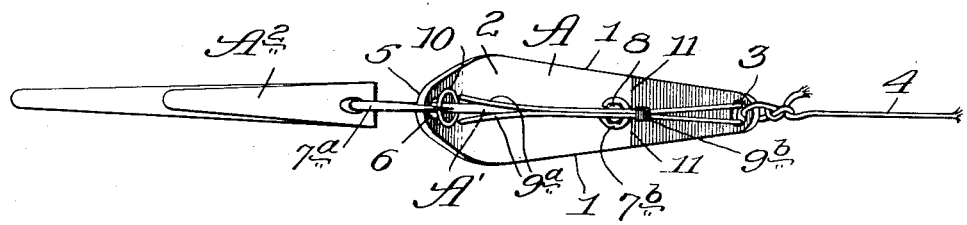
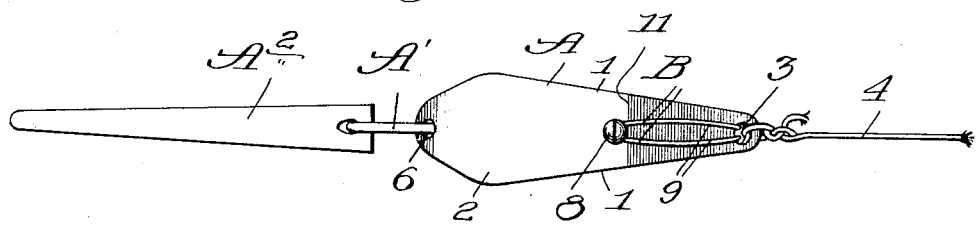
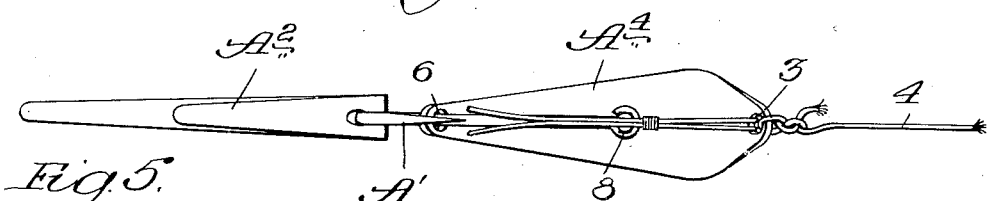
Inventor:
George T. Buddle,
By Dyrenforth, Lee, Chritton & Wiles
Attys Patented Dec. 12, 1933

1,939,291

UNITED STATES PATENT OFFICE 1,939,291

FISHHOOK

George T. Buddle, Chicago, Ill., assignor of twenty-five per cent to Julius J. Sturm and twenty-five per cent to Minnie N. Sturm, Chicago, Ill.

Application March 25, 1931. Serial No. 525,289

8 Claims. (Cl. 43—39)

The present invention pertains to fish-hooks; and the primary object is to provide an improved fish-hook, which is particularly adapted to casting and trolling.

A feature of the invention resides in the construction of the fish-hook proper and its supporting member; and a further feature is a device which enables the fish-hook to be used as a weedless hook, or otherwise, at will.

The invention is illustrated in a preferred embodiment in the accompanying drawing, in which—

Figure 1 is a side elevational view of a fish-hook empodying the invention, the dotted lines showing a weed-guard in operative position and the full lines showing it in inoperative position; Fig. 2, a plan view of the same; Fig. 3, a rear view of the same; Fig. 4, a plan view of the invention in a modified form; and Fig. 5, a transverse sectional view illustrating a modification.

In the construction shown in Figs. 1-3, the device is shown as comprising a longitudinally curved plate-like member A; a hook, proper, A' mounted on the member A; a bait or lure $A^2$ connected with the hook; and a weed-guard B mounted on the member A and co-operating with the point of the hook.

The member A is shown as a plate, preferably of sheet metal, which is curved in a longitudinal direction, the convex surface of the plate being turned downwardly. The plate has frontwardly convergent edges 1 extending from a wide portion of the plate at 2 to the front end thereof, the front end of the plate being quite narrow and being provided with a perforation 3, at which point is secured a line 4.

The front end of the plate A is designated 5, this end being somewhat blunt and the edges tapering from the wide portion 2, which is close to the rear end of the plate. At its rear end portion, the plate is provided with a perforation 6.

The hook, proper, A' has a shank-portion 7 and a hook-portion $7^a$, which is equipped with the usual barb.

The shank-portion passes through the perforation 6, and overlies the rear portion of the plate A. It is equipped at its front end with an eye $7^b$ which is secured by means of a screw or small bolt 8 to the median portion of the plate A.

The hook-portion $7^a$ curves outwardly and frontwardly and the pointed extremity thereof overlies the rear extremity 5 of the plate.

The member $A^2$ may consist of a rind, a piece of buckskin, or any other suitable lure.

The weed-guard B is shown as consisting of a piece of spring wire which is folded midway of its length to provide a loop-portion 9 and yielding prongs $9^a$. The wire-members are shown bound together by a very fine wire wrapping $9^b$.

The loop-portion of the folded wire is passed through the perforation 3, and is bent rearwardly to underlie the front portion of the plate A. The end of the loop is secured to the screw or bolt 8.

The prongs $9^a$ overlie the plate A. Normally, they occupy the dotted position shown in Fig. 1, in which position they serve to guard the point of the hook against weeds. When desired, the yielding members of the wire may be forced downwardly and secured in the full line position shown in Fig. 1, by means of a small ring 10 slidably mounted on the shank 7 of the hook, proper.

It may be stated that when the device is drawn through the water, either in trolling or in winding up the line after casting, the boat-like shape of the supporting plate A, particularly in view of the tapered edges of the plate, will cause the device to wriggle as it is drawn through the water, thereby producing an attractive lure to the fish.

If desired, the plate A may be dished transversely. That is, it may have a slightly concavo-convex cross-section. Such a supporting blade or plate is illustrated in Fig. 5, being designated $A^3$. Except for the transverse curvature, it may be in all other respects like the plate A.

The plate A may be attractively painted in bright colors. For illustration, the wide rear portion of the plate may be white, and the front portion may be red. In Figs. 2 and 3, the line 11 indicates the dividing line between the colors.

In the modification shown in Fig. 4, the construction is like that already described, except that the supporting plate, designated $A^4$, is turned end for end from the position shown in Fig. 2. In other words, the broad portion of the plate is near the front end thereof, while the point portion of the hook overlies the narrow rear end of the plate.

The first-described construction is preferred, however.

If desired, the weed-guard B may be omitted. It is rather common to equip a fish-hook device with a feather which serves partly as a lure and partly as a weed-guard. Such an expedient may be employed in connection with the improved hook, if desired.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A device of the character set forth comprising, a supporting plate having a longitudinal curvature and a flat cross-section; a hook proper, mounted on said plate; a weedguard mounted on said plate; and a device mounted on said hook for securing the weed-guard in inoperative position.

2. A device as specified in claim 1, characterized by the shank-portion of the hook, proper, extending through a perforation in the rear end of the plate, the front end of said shank being attached to the median portion of the plate, and characterized further by a retaining ring for the weed-guard slidably mounted on the shank of the hook-proper.

3. A device as specified in claim 1, in which said device for securing the weed-guard in inoperative position is slidably mounted on the shank-portion of the hook.

4. An artificial bait comprising a body member, a fish hook attached to said body member, a guard wire of forked shape for said fish hook, a pivotal support for said guard wire, means to support said wire in working position, and means to hold said wire in inoperative position.

5. An artificial bait, comprising a body member, a fish hook attached to said body member, a guard wire of forked shape including supporting means to hold said wire in proper working position, and means connected with said fish hook to hold said guard wire in inoperative position.

6. An artificial bait, comprising a body member, a hook attached to said body member, a fork-shaped guard for said hook, means to connect said guard pivotally with said body member, and means to hold said guard in inoperative position close to said body member, said means being attached to said hook.

7. An artificial bait comprising: a body member having an aperture in its front end portion; a rearwardly extending hook having its front end portion bolted to said body member; a weed guard comprising a bent resilient wire having one end extending through said aperture and bolted to the body member on the opposite side from said hook and the other end extending rearwardly to guard the point portion of said hook; and means slidably mounted on the shank of said hook adapted to slip over said guard and hold it in inoperative position.

8. A device as specified in claim 7, in which the rear end portion of the weed guard is fork-shaped and the other end is in the form of a loop, and one bolt serves to lock both the hook and the loop-portion of the guard against the body member.

GEORGE T. BUDDLE.